(12) United States Patent
Yanagihara

(10) Patent No.: US 8,918,471 B2
(45) Date of Patent: Dec. 23, 2014

(54) INTEGRATED LOCAL/REMOTE SERVER COMPUTER ARCHITECTURE FOR ELECTRONIC DATA TRANSFER

(75) Inventor: Kazuhisa Yanagihara, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 13/475,889

(22) Filed: May 18, 2012

(65) Prior Publication Data

US 2013/0311578 A1    Nov. 21, 2013

(51) Int. Cl.
    *G06F 15/16*    (2006.01)
(52) U.S. Cl.
    USPC ........................................... 709/206
(58) Field of Classification Search
    USPC ........................................... 709/206
    See application file for complete search history.

(56) References Cited

U.S. PATENT DOCUMENTS

| | | | |
|---|---|---|---|
| 6,304,913 B1 | 10/2001 | Rune | |
| 7,257,634 B2 | 8/2007 | Colby et al. | |
| 7,818,454 B2 | 10/2010 | Kim et al. | |
| 2003/0229809 A1* | 12/2003 | Wexler et al. | 713/201 |
| 2006/0212935 A1 | 9/2006 | Burman et al. | |
| 2007/0256130 A1* | 11/2007 | Jung et al. | 726/24 |
| 2008/0109521 A1* | 5/2008 | Mousseau et al. | 709/206 |
| 2010/0250680 A1 | 9/2010 | Bhatt et al. | |
| 2010/0268814 A1 | 10/2010 | Cross et al. | |
| 2011/0219104 A1* | 9/2011 | Sugawara | 709/223 |

FOREIGN PATENT DOCUMENTS

WO    00/29990    5/2000

OTHER PUBLICATIONS

International Search Report and Written Opinion of the International Searching Authority, PCT Application No. PCT/US2013/038274, Jul. 29, 2013, 12 pp.

* cited by examiner

*Primary Examiner* — Tu Nguyen
(74) *Attorney, Agent, or Firm* — Fish & Richardson P.C.

(57) ABSTRACT

Systems, methods, and computer program products for an integrated local/remote server computer architecture for electronic data transfer are disclosed. In some implementations, a local server computer in a local area network (LAN) is integrated with a network-based server computer outside the LAN, such that the local server computer acts as a cache server computer to the remote server computer. For data transfer between client devices within the LAN, a Domain Name System (DNS) server redirects requests for data transfer destined for the remote server computer to the local server computer to improve data transfer performance within the LAN. In some implementations, the data is also transferred or "mirrored" to the remote server computer (e.g., encrypted backup data) at a data transfer rate that is different from the data transfer rate in the LAN.

9 Claims, 4 Drawing Sheets

INTEGRATED LOCAL/REMOTE SERVER COMPUTER ARCHITECTURE FOR ELECTRONIC DATA TRANSFER

TECHNICAL FIELD

This disclosure is related generally to client/server computer architectures for data transfer services.

BACKGROUND

A mail server is a computer that serves as an electronic post office for email. Mail exchanged across networks is passed between mail servers that run software that implements standardized protocols for handling e-mail messages and any media content the messages may contain. A mail server computer runs software that implements a mail transfer agent (MTA) or mail relay. The MTA transfers electronic mail messages from one computer to another using a client-server computer architecture. The MTA implements both the client (sending) and server (receiving) portions of the Simple Mail Transfer Protocol (SMTP).

A Domain Name System (DNS) is a hierarchical distributed naming system for computers, services, or any resource connected to the Internet or a private network. It associates various information with domain names assigned to each of the participating entities. A Domain Name Service translates queries for domain names (which are meaningful to humans) into Internet Protocol (IP) addresses for the purpose of locating computer services and devices worldwide. The DNS associates a mail server to a domain with mail exchanger (MX) resource records containing the domain name of a host providing MTA services. A MX record is a type of resource record in the DNS that specifies a mail server responsible for accepting e-mail messages on behalf of a recipient's domain, and a preference value used to prioritize mail delivery if multiple mail servers are available. The set of MX records of a domain name specifies how e-mail should be routed with SMTP.

SUMMARY

Systems, methods, and computer program products for an integrated local/remote server computer architecture for electronic data transfer are disclosed. In some implementations, a local server computer in a local area network (LAN) is integrated with a network-based server computer outside the LAN, such that the local server computer acts as a cache server computer to the remote server computer. For data transfer between client devices within the LAN, a DNS server redirects requests for data transfer destined for the remote server computer to the local server computer to improve data transfer performance within the LAN. In some implementations, the data (e.g., encrypted backup data) is also transferred or "mirrored" to the remote server computer at a data transfer rate that is different from the data transfer rate of the LAN.

An exemplary client/server architecture can include a local server, remote server computer, local DNS server computer, a LAN and a router to retrieve information outside the LAN. For data transfer within the LAN (hereafter also referred to as "local data transfer"), the DNS server computer redirects requests for data transfer from the remote server computer to the local server computer to improve performance data transfer performance. Since LANs often transfer data at much higher rates than transmissions to remote server computers a faster data transfer performance can be realized. The integrated local/remote server computer architecture allows the client device to send large files to the local server at a first data rate and the local server can than transmit those files to the remote server computer for storage at a second, different data rate. This allows the client device to leave the LAN without having to wait for the files to be transmitted to the remote server computer.

Particular implementations of the integrated local/remote server computer architecture disclosed herein provide one or more of the following advantages. Integrating local/remote server computers provides improved performance for local data transfer by not sending locally destined data through a remote mail server, and improved storage on remote mail servers, which often have file size limitations or storage space limitations.

The details of the disclosed implementations are set forth in the accompanying drawings and the description below. Other features, objects, and advantages will be apparent from the description and drawings, and from the claims.

DESCRIPTION OF DRAWINGS

The same reference symbol used in various drawings indicates like elements.

DETAILED DESCRIPTION

Figure 1:
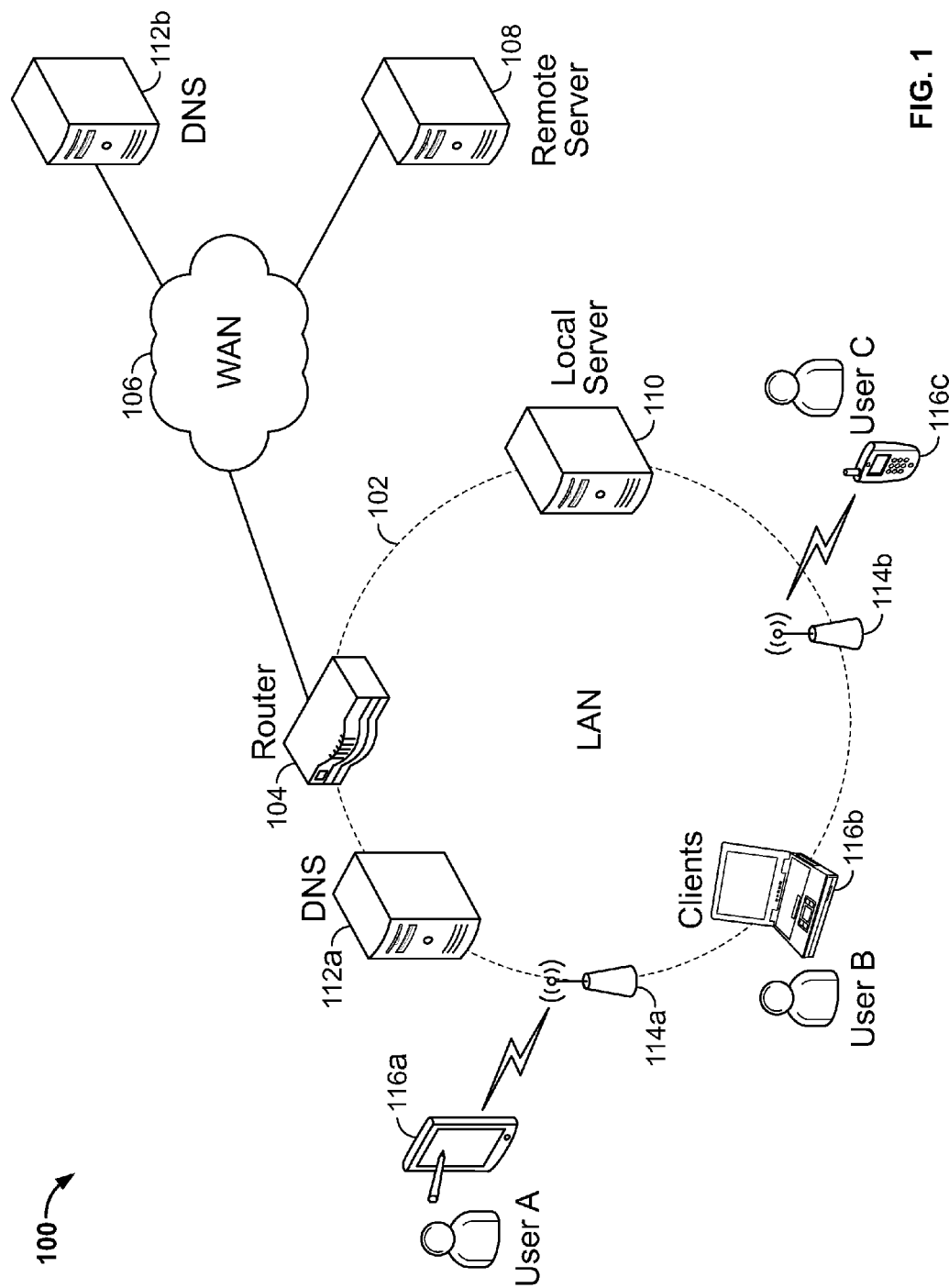
FIG. 1 illustrates an exemplary client/server computer architecture with integrated local/remote server computers for electronic data transfer.

FIG. 1 illustrates an exemplary client/server computer architecture with integrated local/remote server computers for electronic data transfer. In some implementations, an integrated local/remote server computer environment 100 can include LAN 102, router 104, WAN 106 (e.g., the Internet), remote server computer 108, local server computer 110, local DNS computer 112a, remote DNS computer 112b, wireless access points 114a, 114b and client devices 116a-116c.

LAN 102 can be a computer network that interconnects client devices 116a-116c and local server computer 110 in a limited area such as a home or office building. Some examples of LAN technologies include but are not limited to Ethernet over twisted pair and Wi-Fi. In addition to LANs, environment 100 can include other types of networks, including but not limited to personal area networks (PANs) and metropolitan area networks (MANs) that can be connected to LAN 102 and/or WAN 106. LANs typically provide higher data-transfer rates than WANs.

Client devices 116a-116c can be any device capable of connecting to a network transmitting or receiving data from another device, including but not limited to desktop computers, notebook computers, smart phones, electronic tablets, email devices, game consoles, set top boxes, television systems, etc. In the example shown, User A is operating electronic tablet 116a, User B is operating notebook computer 116b and User C is operating smartphone 116c. In this example configuration, electronic tablet 116a and smartphone 116c are wirelessly coupled to LAN 102 through access points 114a, 114, respectively.

WAN 106 can be a telecommunication network that covers a broad area, such as the Internet. WAN 106 can connect to LAN 102 using router 104, so that users A, B and C operating client devices 116 in one location can communicate with remote server computer 106 in another location to receive services. WAN 106 can be built using leased lines, circuit switching or packet switching technologies. TCP/IP can be used to deliver transport and addressing functions and the protocols Packet over SONET/SDG, MPLS, ATM and Frame Relay can be used by service providers to deliver links that are used in WAN 106.

DNS computers 112b can be coupled to LAN 102 through router 104. A DNS is a hierarchical distributed naming system for resources (e.g., computers, services) connected to the Internet or a private network. DNS computers 112a, 112b associate various information with domain names assigned to participating entities. DNS computers 112a, 112b translate queries for human-readable domain names (e.g., remoteserver.com) into IP addresses for the purpose of locating computer services and devices (e.g., local server 110, remote server computer 108) worldwide.

Example Use Case Scenarios

In a first use case scenario, User A wants to transfer a 100 MB file to Users B and C. Users B and C are on LAN 102. In conventional architectures, the 100 MB file would be sent to remote server 108 through router 104 at a slow data transfer rate and subsequently sent back down to Users B and C through router 104 at a slow data transfer rate. In the integrated local/remote server computer architecture, the 100 MB file will be redirected by local DNS computer 112a to local server computer 110 when local DNS computer 112a determines that the destination for the data is in LAN 102 (client devices 116b, 116c). Local server computer 110 can send the data to client devices 116b, 116c at first data rate. In some implementations, local server computer 110 can also send or "mirror" the data to remote server computer 108 at a second, different (e.g., slower) data rate. The data can be encrypted at the client device before being transferred using any known encryption algorithm. The result is that Users B and C will get the file quicker than would otherwise occur with the conventional architecture (routing through remoter server computer 108). Moreover, User A does not need to wait for the entire 100 MB file to be sent to remote server computer 108 before disconnecting and leaving LAN 102. Since data that is stored on client device 116 is mirrored to remote server computer 108, the user can access their data when disconnected from LAN 102. Local server computer 110 can be transparent to User A.

In a second use case scenario, the storage available to remote server computer 108 is limited. For example, storage accessible by remote server computer 108 may be limited to, for example, 3000 digital photos that can be synced to multiple devices. Thus, when a user attempts to synchronize a $3001^{st}$ photo the first photo will no longer be stored on remote server 108. Having local server computer 110 in LAN 102 can remedy the storage limitations of remote server computer 108 by caching the photos on a storage device that are accessible by User A through local server computer 110 when User A is coupled to LAN 102. In some implementations, the files stored on remote server computer 108 can be a subset of the files stored on local server computer 110.

In some implementations, remote server computer 108 can be operated by a hosting service in a "cloud" computing environment. Encrypting the data locally before sending to remote server computer 108 helps prevent the hosting service from viewing the data.

Figure 2:
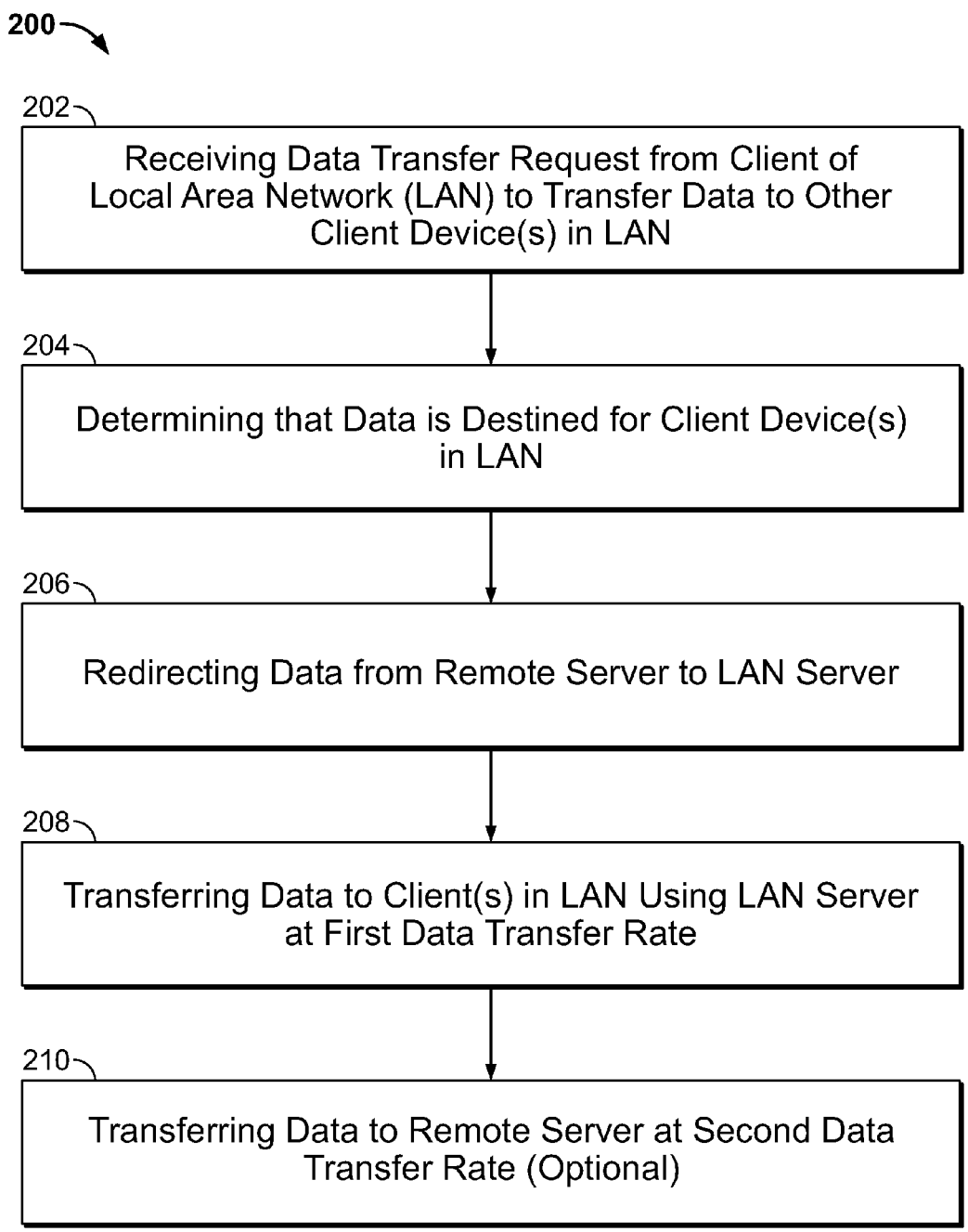
FIG. 2 is a flow diagram of exemplary process for local electronic data transfer using the integrated local/remote server computer architecture of FIG. 1.

FIG. 2 is a flow diagram of exemplary process 200 for local electronic data transfer using the integrated local/remote server computer architecture of FIG. 1.

In some implementations, process 200 can begin when a request is received from a client device in a LAN to transfer data to one or more other client devices in the LAN (202). The request can be any data transfer request including but not limited to a request to transfer e-mail, a text message, photos or any other digital media items.

Process 200 can continue by determining that the data is destined for one or more client devices in the LAN. For example, in an e-mail use scenario, a local DNS computer coupled to the LAN can determine that the destination address of the data is in the LAN.

Process 200 can continue by redirecting the data from the remote server computer to a LAN server (206). For example, in an e-email use scenario, a DNS computer can replace the domain name associated with the remote server with a domain associated with the LAN server. The domain name of the LAN server is then resolved into an IP address for the LAN server and the data is re-routed to the LAN server using the IP address.

Process 200 can continue by transferring the data to the one or more clients in the LAN using the LAN server at a first data rate (208) and, optionally, transferring or "mirroring" the data to the remote server computer outside the LAN at a second data rate (210). The second data rate can be slower than the first data rate. The data transfer to the remote server computer can occur after the data has been transferred to the one or more client devices or concurrently. The data transfer to the remote server computer can be done transparently as a background process. The data can be encrypted before being transferred using any known encryption algorithm. Mirroring data to the remote server allows the user to disconnect from the LAN and still access their data from the remote server computer.

Exemplary Client Device Architecture

Figure 3:
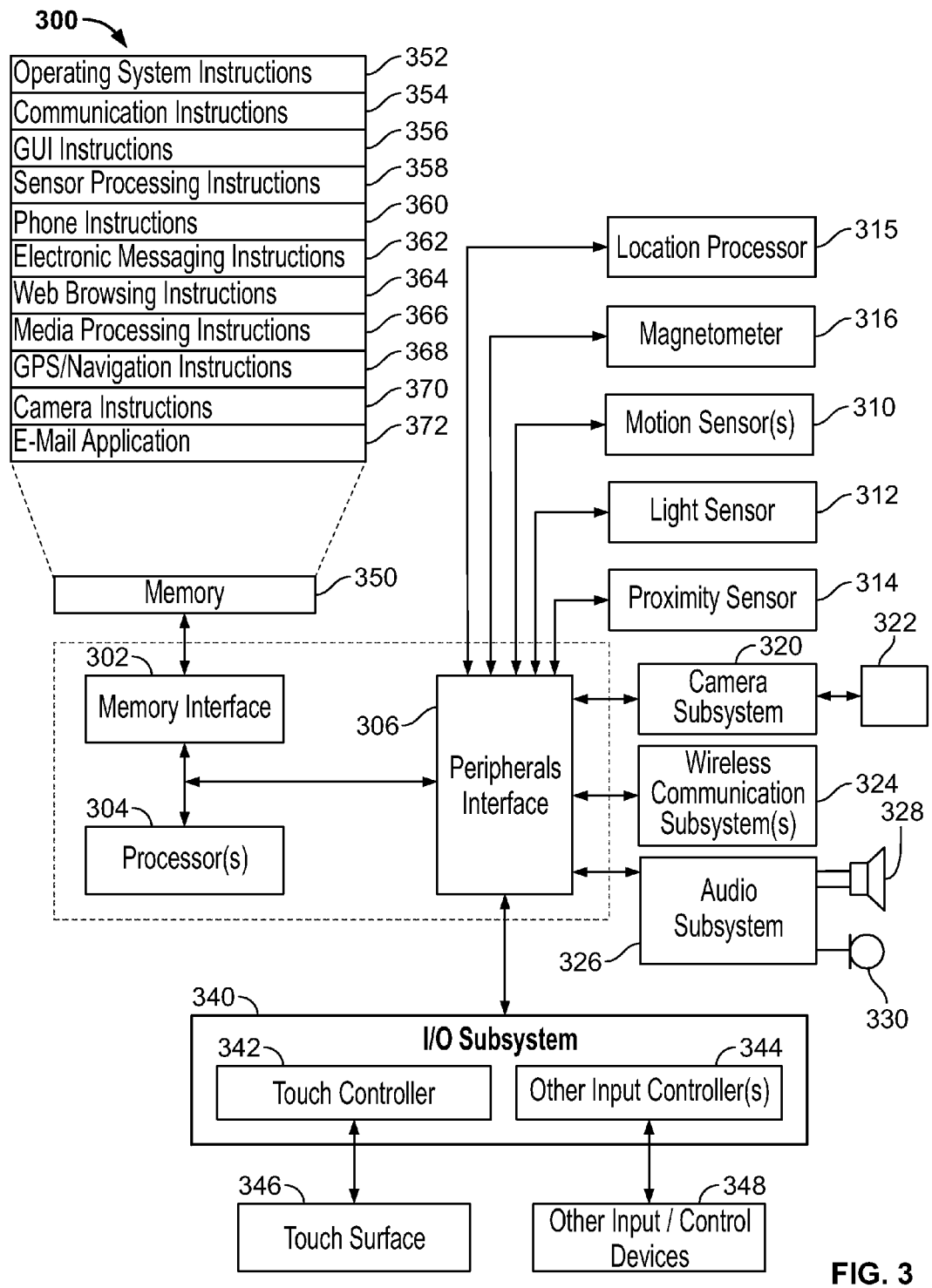
FIG. 3 is a block diagram of an exemplary architecture of a client device of the client/server computer architecture of FIG. 1.

FIG. 3 is a block diagram of an exemplary architecture of a client device of the client/server computer architecture of FIG. 1. Architecture 300 can be implemented in any device for generating the features described in reference to FIGS. 1 and 2, including but not limited to portable or desktop computers, smart phones and electronic tablets, television systems, game consoles, kiosks and the like. Architecture 300 can include memory interface 302, data processor(s), image processor(s) or central processing unit(s) 304, and peripherals interface 306. Memory interface 302, processor(s) 304 or peripherals interface 306 can be separate components or can be integrated in one or more integrated circuits. The various components can be coupled by one or more communication buses or signal lines.

Sensors, devices, and subsystems can be coupled to peripherals interface 306 to facilitate multiple functionalities. For example, motion sensor 310, light sensor 312, and proximity sensor 314 can be coupled to peripherals interface 306 to facilitate orientation, lighting, and proximity functions of the device. For example, in some implementations, light sensor 312 can be utilized to facilitate adjusting the brightness of touch surface 346. In some implementations, motion sensor 310 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 306, such as a temperature sensor, a biometric sensor, or other sensing device, to facilitate related functionalities.

Location processor 315 (e.g., GPS receiver) can be connected to peripherals interface 306 to provide geo-positioning. Electronic magnetometer 316 (e.g., an integrated circuit chip) can also be connected to peripherals interface 306 to provide data that can be used to determine the direction of magnetic North. Thus, electronic magnetometer 316 can be used as an electronic compass.

Camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 324. Communication subsystem(s) 324 can include one or more wireless communication subsystems. Wireless communication subsystems 324 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 324 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 324 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 326 can be coupled to a speaker 328 and one or more microphones 330 to facilitate voice-enabled functions, such as voice recognition, voice replication, digital recording, and telephony functions.

I/O subsystem 340 can include touch controller 342 and/or other input controller(s) 344. Touch controller 342 can be coupled to a touch surface 346. Touch surface 346 and touch controller 342 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 346. In one implementation, touch surface 346 can display virtual or soft buttons and a virtual keyboard, which can be used as an input/output device by the user.

Other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of speaker 328 and/or microphone 330.

In some implementations, device 300 can present recorded audio and/or video files, such as MP3, AAC, and MPEG files. In some implementations, device 300 can include the functionality of an MP3 player and may include a pin connector for tethering to other devices. Other input/output and control devices can be used.

Memory interface 302 can be coupled to memory 350. Memory 350 can include high-speed random access memory or non-volatile memory, such as one or more magnetic disk storage devices, one or more optical storage devices, or flash memory (e.g., NAND, NOR). Memory 350 can store operating system 352, such as Darwin, RTXC, LINUX, UNIX, OS X, WINDOWS, or an embedded operating system such as VxWorks. Operating system 352 may include instructions for handling basic system services and for performing hardware dependent tasks. In some implementations, operating system 352 can include a kernel (e.g., UNIX kernel).

Memory 350 may also store communication instructions 354 to facilitate communicating with one or more additional devices, one or more computers or servers. Communication instructions 354 can also be used to select an operational mode or communication medium for use by the device, based on a geographic location (obtained by the GPS/Navigation instructions 368) of the device. Memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes; camera instructions 370 to facilitate camera-related processes and functions; and e-mail application 372 that is capable of sending and receiving e-mails. The memory 350 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 350 can include additional instructions or fewer instructions. Furthermore, various functions of the mobile device may be implemented in hardware and/or in software, including in one or more signal processing and/or application specific integrated circuits.

Exemplary Server Computer Architecture

Figure 4:
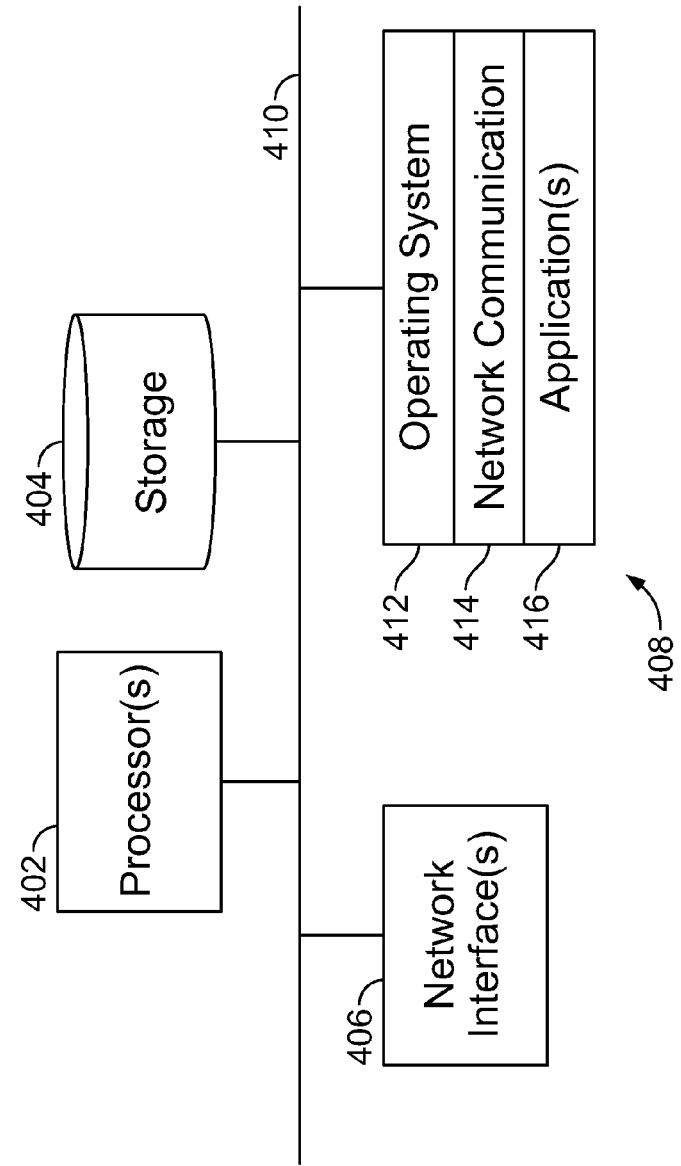
FIG. 4 is a block diagram of an exemplary architecture of a server computer of the client/server computer architecture of FIG. 1.

FIG. 4 is a block diagram of an exemplary server computer architecture 400 of the client/server computer architecture of FIG. 1. The architecture 400 can be implemented on any data processing apparatus that runs software applications derived from instructions, including without limitation personal computers or mainframe computers. In some implementations, the architecture 400 can include one or more processors 402, storage device(s) 404, network interface(s) 406 and memory 408. Each of these components can be coupled by one or more communication channels 410.

Communication channels 410 can be any known internal or external bus technology, including but not limited to ISA, EISA, PCI, PCI Express, NuBus, USB, Serial ATA or FireWire. Storage device(s) 404 can be any medium that participates in providing instructions to processor(s) 402 for execution, including without limitation, non-volatile storage media (e.g., optical disks, magnetic disks, flash drives, etc.) or volatile media (e.g., SDRAM, ROM, etc.).

Memory 408 can include various instructions 412 for implementing an operating system (e.g., Mac OS®, Windows®, Linux). The operating system can be multi-user, multiprocessing, multitasking, multithreading, real-time and the like. The operating system performs basic tasks, including but not limited to: keeping track of files and directories on storage devices(s) 404; controlling peripheral devices (e.g., storage device(s) 402) which can be controlled directly or through an I/O controller; and managing traffic on communication channels 410. Network communications instructions 414 can establish and maintain network connections with client devices (e.g., software for implementing communication protocols, such as TCP/IP, HTTP, Ethernet, etc.).

Application(s) 416 can be any application that provides a service to client devices, including but not limited to e-mail, text messaging, file services, content delivery, etc.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with an author, the features can be implemented on a computer having a display device such as a CRT (cathode ray tube) or LCD (liquid crystal display) monitor for displaying information to the author and a keyboard and a pointing device such as a mouse or a trackball by which the author can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving, from a device coupled to a local area network (LAN), a request to transfer electronic mail;
   replacing, in the request, a first domain name of a first server outside the LAN with a second domain name of a second server in the LAN;
   resolving the second domain name into an Internet Protocol (IP) address of the second server;

transferring the electronic mail to the second server at a first data transfer rate using the IP address of the second server; and mirroring the electronic mail to the first server at a second data transfer rate that is different than the first data transfer rate, wherein the method is performed by one or more hardware processors.

2. The method of claim 1, further comprising:

mirroring the electronic mail to the first server at a second data transfer rate that is slower than the first data transfer rate.

3. The method of claim 1, where the electronic mail is encrypted before being transferred from the second server to the first server.

4. An apparatus comprising:

one or more processors;

a computer readable medium coupled to the one or more processors and configured to store instructions, which, when executed by the one or more processors, causes the one or more processors to perform operations comprising:

receiving, from a device coupled to a local area network (LAN), a request to transfer electronic mail;

replacing, in the request, a first domain name of a first server outside the LAN with a second domain name of a second server in the LAN;

resolving the second domain name into an Internet Protocol (IP) address of the second server;

transferring the electronic mail to the second server at a first data transfer rate using the IP address of the second server; and mirroring the electronic mail to the first server at a second data transfer rate that is different than the first data transfer rate.

5. The apparatus of claim 4, where the one or more processors perform the operation comprising:

mirroring the electronic mail to the first server at a second data transfer rate that is slower than the first data transfer rate.

6. The apparatus of claim 4, where the electronic mail is encrypted before being transferred from the second server to the first server.

7. A system comprising:

a device coupled to a local area network (LAN);

a router coupled to the LAN and to a wide area network (WAN);

a domain name server coupled to the LAN and configured to replace, in a transfer request from the device, a first domain name with a second domain name and to resolve the second domain name into an Internet Protocol (IP) address;

a first server coupled to the WAN and having the first domain name; and a second server coupled to the LAN and having the IP address, the second server configured to receive the electronic mail at a first data transfer rate and to mirror the electronic mail to the first server at a second data transfer rate that is different than the first data transfer rate.

8. The system of claim 7, where the electronic mail is mirrored to the first server at a second data transfer rate that is slower than the first data transfer rate.

9. The system of claim 8, where the electronic mail is encrypted before being transferred from the second server to the first server.

* * * * *